May 1, 1945.  C. E. LINDEN ET AL  2,375,169

CLAMPING MECHANISM FOR MACHINE TOOLS

Filed Dec. 8, 1942   2 Sheets-Sheet 2

INVENTORS
Carl E. Linden
Raymond H. McClellan
BY Word, Arey, Herrin & Evans
ATTORNEYS Patented May 1, 1945

2,375,169

UNITED STATES PATENT OFFICE 2,375,169

CLAMPING MECHANISM FOR MACHINE TOOLS

Carl E. Linden, Cincinnati, and Raymond H. McClellan, Hamilton, Ohio, assignors to The Fosdick Machine Tool Company, Cincinnati, Ohio, a corporation of Ohio Application December 8, 1942, Serial No. 468,212

1 Claims. (Cl. 77—27)

This invention relates to machine tools, and is particularly directed to clamping mechanism for a radial drill. Specifically, the clamping mechanism is disclosed for use in clamping the column of the machine tool to the base or stump. Obviously, the invention may be used for clamping the arm to the column, if desired.

In the past, the outer circular element, that is, the column encircling the base or the arm encircling the column, as the case may be, has been split longitudinally. Clamping devices have been employed for drawing these split portions together. One of the problems arising from the use of this type of clamp has been that the clamping mechanism when operated tended to cause a slight rotative displacement or inching of the part being clamped with respect to the element to which it was being clamped. Any slight displacement rotatively would be multiplied at the tool which is supported on the radial arm. Accordingly, it has been difficult to maintain the tool in correct alignment with the hole to be drilled for the clamping action tended to cause the aforesaid displacement.

This displacement or undesired rotative movement at clamping occurred because of the fact that the split portion of the column engaged the base member unevenly, whereby gripping would occur at one point before it would at another. Since the clamp pressure has been exerted more or less tangentially or circumferentially with respect to the column, the action, in pulling these split portions together, has been uneven; that is to say, one split end might remain stationary and the other be pulled to it. This obviously would swing the column or arm slightly.

Accordingly, it has been an object of the present inventors to provide a clamping mechanism for clamping one circular element to another, as for example, the column of a radial drill to the base, in which there is no possibility for the clamping forces to cause rotative displacement from the desired fixed position. An essential characteristic of the invention resides in the mounting of the clamping shoe or block so that it moves directly radially and does not permit the exertion of circumferential or lateral forces tending to cause the column to creep one way or the other.

It has been a further object of the present inventors to provide an improved arrangement of the clamping block and its operating means wherein these parts are firmly mounted or journalled with respect to the element which they are clamping.

Other objects and certain advantages will be more fully apparent from a description of the drawings in which.

Figure 1:
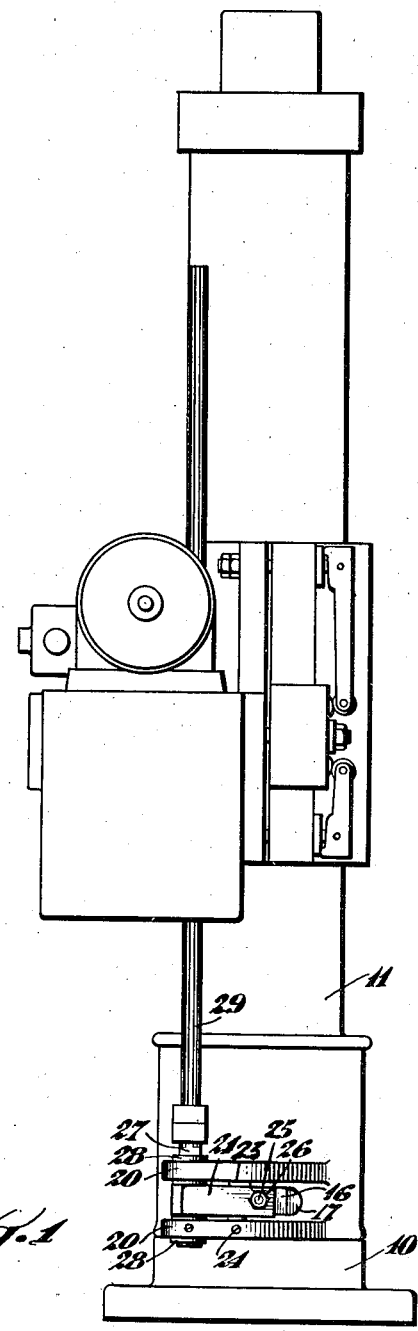
Figure 1 is an end view of a radial drill incorporating the improved clamping mechanism of this invention for use in clamping the column to the base.

Although, as stated, the clamping mechanism of this invention may be used for purposes other than clamping the column to the base, the drawings illustrate the mechanism adapted to this use.

Referring to the drawings, the base of the radial drill is generally indicated at 10 and the column at 11. These parts, as is conventional, are cylindrical. The base includes the customary counter-turned portion 12 upon which the base 13 of the column is engaged for rotative support. A circumferentially disposed slot 14 is provided toward the lower extremity of the base of the column. This slot has rounded ends 15. A clamping shoe or block 16 is radially slidably mounted in the slot 14. The ends of the slot are disposed in parallelism with a radius of the column.

Figure 2:
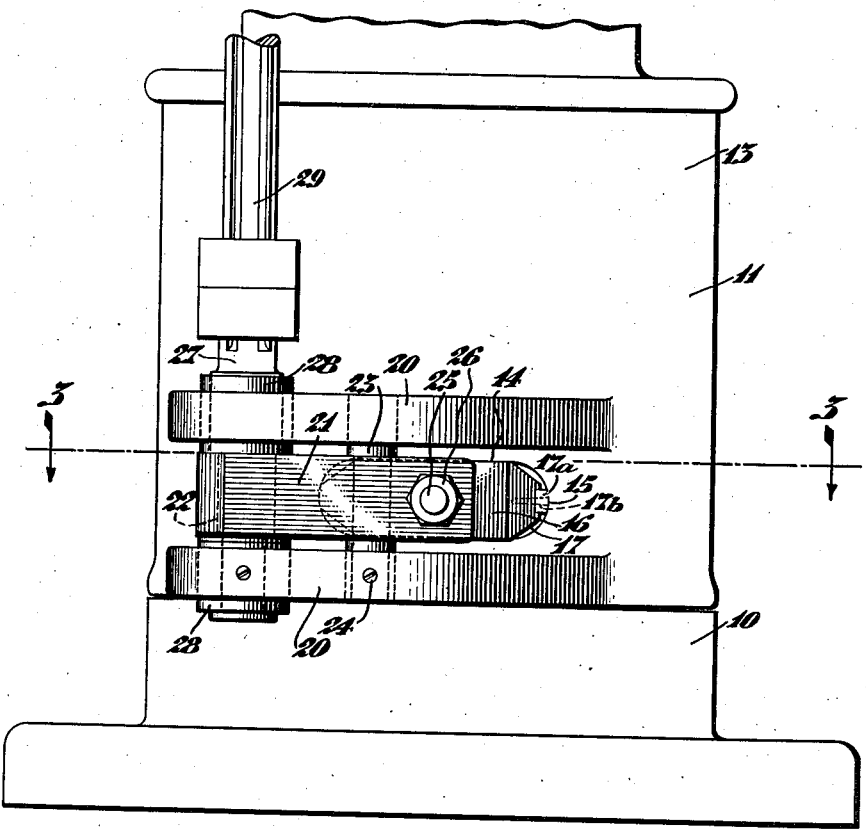
Figure 2 is an enlarged fragmentary view of the base of the column and the base element showing, in enlarged detail, the improved clamping means.
Figure 3:
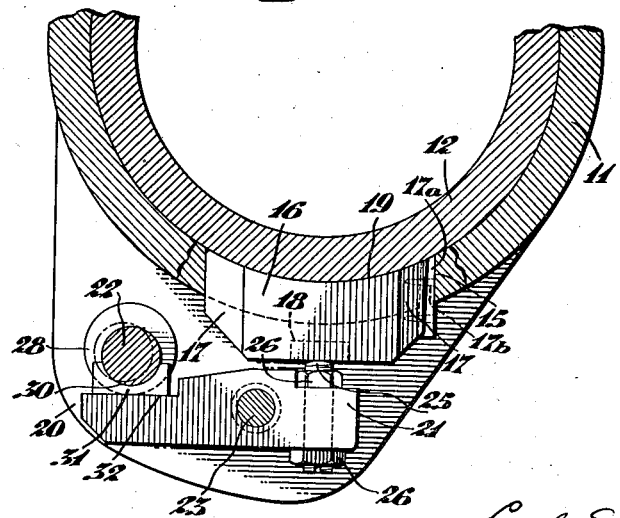
Figure 3 is a sectional view taken on line 3—3 of Figure 2.

In order to prevent any binding of the block or shoe, contact of the ends of the shoe with the circular ends of the slot is reduced. This reduction is accomplished by forming the ends of the shoe with flat angular wall portions 17 providing clearances with respect to the circular ends of the slot (Figure 2). Thus, the contact of the ends of the shoe with the slot is reduced by approximately eighty per cent.

At one end of the shoe, a gib plate 17a is provided. This gib lies along one side edge of the shoe between this edge and the edge of the slot. The gib affords about the same amount of contact as the other end of the shoe. It is held in place by means of pins 17b after it has been adjusted.

Within the center of the outer face of the shoe, a contact pad 18 is counter-sunk. This pad is replaceable in case of wear. The inner face 19 of the shoe is arcuate, corresponding in curvature to the circular curvature of the circular base. Horizontal lugs 20—20 are provided above and below the slot. These lugs, which are disposed transversely to the axes of the members, provide bearings for the shoe actuating lever 21 and the lever actuating cam 22.

The lever 21 is fulcrumed on a pivot pin 23 and the pivot pin is fixed in position in the respective lugs by means of a screw 24. The actuating end of the lever carries a contact screw 25, one end of which engages the contact plate 18. The screw is held in place by means of lock nuts 26, one on each end. The other or actuating end of the lever is engaged by the cam 22. This cam is formed on a cam shaft 27 journalled in the lugs 20—20. The shaft is disposed in parallelism with the fulcrum pin and within bearing sleeves 28—28.

This cam or eccentric fits within the arcuate or semi-circular surface 30 of a slide block or bearing element 31. This element in turn engages the flat surface 32 at the end of the lever 21 for sliding movement therein as displaced laterally by the eccentric.

From the foregoing description it may be seen that rotation of the cam 22 effects operation of the clamp. This rotation may be provided in any suitable manner. Thus, in the structure shown in the drawings a shaft 29 projects upwardly from the cam 22 as an extension and this shaft 29 may be rotated through any desired means, for instance, by means of an hydraulically operated lever mounted on the shaft. When the cam shaft 22 is rotated the lever 21 swings on its pivot pin 23 thereby moving the shoe 16 into clamping engagement with the base. This engagement is central. The force exerted by the lever 21 upon the shoe is directly toward the center of the column and, inasmuch as there are no fixed connections, the shoe may slide freely without having forces exerted upon it which tend to cock the shoe or bind it in its guideway.

Having described our invention, we claim:

A clamp mechanism comprising a column, a base to which said column is adapted to be clamped, said column including a slot, the lateral guiding edges of which are parallel to a radius line of the column, a clamping block guided in said slot, said column including vertically spaced lugs disposed transverse to the axis of the column, a lever fulcrumed for pivotal movement between said lugs and having one end engaging said block and, an operating cam mounted between said lugs and having bearing means therein, said cam engaging the outer end of said lever for urging said clamping block against the base.

CARL E. LINDEN
RAYMOND H. McCLELLAN.